(12) United States Patent
Koyama et al.

(10) Patent No.: US 12,174,294 B2
(45) Date of Patent: Dec. 24, 2024

(54) METHOD AND APPARATUS FOR DETECTING OBJECT

(71) Applicant: DENSO CORPORATION, Kariya (JP)

(72) Inventors: Yu Koyama, Nisshin (JP); Mitsuyasu Matsuura, Nisshin (JP); Satoru Noro, Kariya (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 320 days.

(21) Appl. No.: 17/349,608

(22) Filed: Jun. 16, 2021

(65) Prior Publication Data

US 2021/0311185 A1 Oct. 7, 2021

Related U.S. Application Data

(63) Continuation of application No. PCT/JP2019/043682, filed on Nov. 7, 2019.

(30) Foreign Application Priority Data

Dec. 18, 2018 (JP) .................. 2018-236665

(51) Int. Cl.
*G01S 15/10* (2006.01)
*G01S 7/52* (2006.01)
*G01S 15/931* (2020.01)

(52) U.S. Cl.
CPC ........ *G01S 15/104* (2013.01); *G01S 7/52026* (2013.01); *G01S 15/931* (2013.01)

(58) Field of Classification Search
CPC .... G01S 7/52026; G01S 15/32; G01S 15/931; G01S 15/104; G01S 15/586;

(Continued)

(56) References Cited

U.S. PATENT DOCUMENTS

2003/0056591 A1\* 3/2003 Martin .................. G01S 15/885
73/602
2008/0252293 A1\* 10/2008 Lagae .................. H04B 1/7163
324/318

(Continued)

FOREIGN PATENT DOCUMENTS

DE          10106142 A1    8/2002
DE     102008044366 A1    6/2010
JP        2012168122 A  *  9/2012

*Primary Examiner* — Daniel L Murphy
*Assistant Examiner* — Amie M Ndure
(74) *Attorney, Agent, or Firm* — MASCHOFF BRENNAN

(57) ABSTRACT

An apparatus includes a drive signal generator that selectively outputs, as a drive signal, one of a first drive signal and a second drive signal. The first drive signal has a first temporal frequency change within a first frequency band that is defined from a first lowest frequency to a first highest frequency inclusive. The second drive signal has a second temporal frequency change within a second frequency band that is defined from a second lowest frequency to a second highest frequency inclusive. Each of the first and second frequency bands has a corresponding one of first and second intermediate frequencies that is defined as one of a center frequency and an average frequency of the corresponding one of the first and second frequency bands. The second intermediate frequency is different from the first intermediate frequency. The second frequency band is partially overlapped with the first frequency band.

16 Claims, 5 Drawing Sheets

(58) Field of Classification Search
CPC .......................... G06K 9/00221–00389; G06T 2207/30196–30201; H04N 5/23219; H04N 21/4223; H04N 21/44218; G06F 17/30793; A61B 5/1176
See application file for complete search history.

(56) References Cited

U.S. PATENT DOCUMENTS

| | | |
|---|---|---|
| 2010/0245154 A1* | 9/2010 | Szajnowski ............. G01S 7/023 |
| | | 342/104 |
| 2014/0269163 A1* | 9/2014 | Proctor ................... G01S 7/521 |
| | | 367/7 |
| 2016/0061942 A1 | 3/2016 | Rao et al. |
| 2016/0103216 A1* | 4/2016 | Whelan ................... G01S 13/90 |
| | | 342/25 A |
| 2016/0151628 A1* | 6/2016 | Simon ................... A61B 5/4836 |
| | | 607/2 |
| 2017/0023670 A1 | 1/2017 | Jansen |
| 2017/0023676 A1* | 1/2017 | Laster ..................... G01S 7/003 |
| 2017/0115388 A1* | 4/2017 | Sathyanarayana .... G01S 15/104 |
| 2018/0375182 A1* | 12/2018 | Kirino ..................... H01P 5/107 |

* cited by examiner

METHOD AND APPARATUS FOR DETECTING OBJECT

CROSS-REFERENCE TO RELATED APPLICATION

This application is a bypass continuation application of currently pending international application No. PCT/JP2019/043682 filed on Nov. 7, 2019 designating the United States of America, the entire disclosure of which is incorporated herein by reference.

This application is based on and claims the benefit of priority from Japanese Patent Application No. 2018-236665 filed on Dec. 18, 2018, the entire disclosure of which is incorporated herein by reference.

TECHNICAL FIELD

The present disclosure relates to methods and apparatuses for detecting surrounding objects.

BACKGROUND

Object detection apparatuses include a type of an object detection apparatus using an ultrasonic sensor. Such type of an object detection apparatus can be installed in a vehicle for detection of objects around the vehicle. Such an object detection apparatus installed in a vehicle may have a lower accuracy of detecting objects due to, for example, interference.

SUMMARY

An apparatus configured to detect an object around the apparatus according to a technological aspect includes a drive signal generator configured to selectively output, as a drive signal, one of a first drive signal and a second drive signal. The first drive signal has a first temporal frequency change within a first frequency band that is defined from a first lowest frequency to a first highest frequency inclusive. The first frequency band has a first intermediate frequency that is defined as one of a center frequency and an average frequency of the first frequency band. The second drive signal has a second temporal frequency change within a second frequency band that is defined from a second lowest frequency to a second highest frequency inclusive. The second frequency band has a second intermediate frequency that is defined as one of a center frequency and an average frequency of the second frequency band. The second intermediate frequency is different from the first intermediate frequency. The second frequency band is partially overlapped with the first frequency band.

DETAILED DESCRIPTION OF EMBODIMENTS

Figure 1:
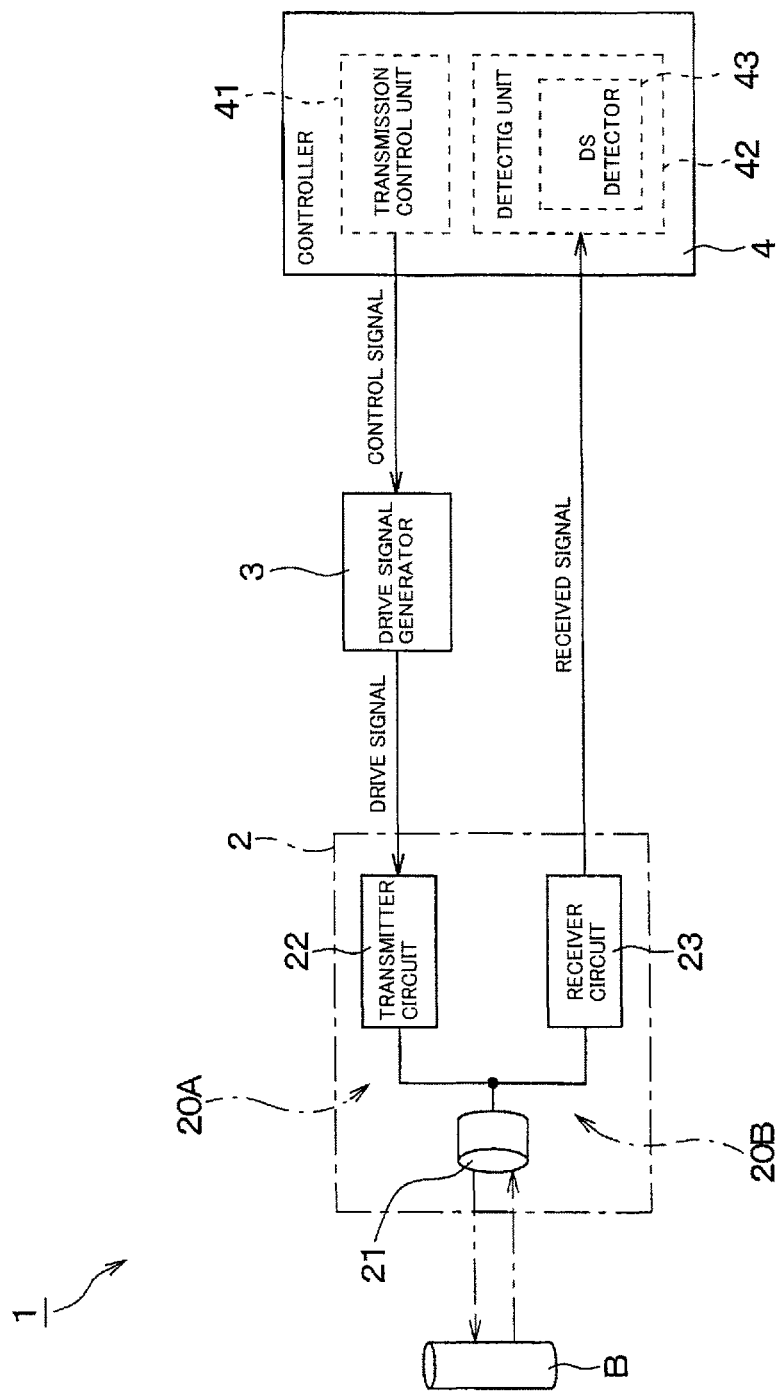
FIG. 1 is a block diagram illustrating a schematic configuration of an object detection apparatus according to an exemplar embodiment.

Interference may be for example generated when such an ultrasonic sensor installed in an own vehicle receives an ultrasonic wave transmitted from another ultrasonic sensor installed in another vehicle located around the own vehicle. As another example, interference may be generated when one of ultrasonic sensors installed in an own vehicle receives an ultrasonic wave transmitted another one of the ultrasonic sensors.

German Patent Application Publication No. 10106142, which will be referred to as patent literature 1, discloses an ultrasonic multi-sensor array. The ultrasonic multi-sensor array disclosed in patent literature 1 includes plural transmitter units at least including first and second transmitter units and at least one receiver unit. The selected first and second transmitter units in the plural transmitter units can be configured to be parallelly operated to transmit an encoded ultrasonic pulse burst.

Encoding of the ultrasonic pulse bursts to be transmitted from the respective first and second transmitter units disclosed in patent literature 1 enables the first and second transmitter units to operate in parallel with, i.e., in simultaneous with, one another.

Specifically, a carrier signal used for encoding the ultrasonic pulse burst of each of the simultaneously operated first and second transmitter units is frequency-modulated individually. The frequency, i.e., the drive frequency, of the carrier signal used for the first transmitter unit increases linearly during the duration of the ultrasonic pulse burst from the first transmitter unit. In contrast, the frequency, i.e., drive frequency, of the carrier signal used for the second transmitter unit decreases linearly during the duration of the ultrasonic pulse burst from the second transmitter unit.

Using the technology disclosed in patent literature 1 enables an ultrasonic sensor installed in an own vehicle to identify whether a received ultrasonic echo results from an ultrasonic wave transmitted from the ultrasonic sensor itself.

Specifically, the transceiver unit of the ultrasonic sensor determines whether a received ultrasonic echo includes the frequency modulation that matches with the frequency modulation of the ultrasonic wave transmitted from the transceiver unit of the ultrasonic sensor itself, thus identifying whether the received ultrasonic echo results from the ultrasonic wave signal transmitted from the ultrasonic sensor itself.

The transmitter unit of such an ultrasonic sensor typically uses a transducer that serves as an oscillator for generating an ultrasonic wave; the transducer has a predetermined resonance frequency. If the drive frequency of the carrier signal for the transmitter unit is distant from the resonance frequency, the tracking ability of the transmitter unit with respect to the drive frequency may be deteriorated. For this reason, a simply linear increase or decrease of the drive frequency of the transmitter unit as disclosed in patent literature 1 may result in an insufficient identification accuracy of received ultrasonic waves.

The present disclosure is based on the circumstances described as an example set forth above. Specifically, the present disclosure provides apparatuses and methods of detecting an object, each of which results in a higher identification accuracy.

A first aspect of the present disclosure is an apparatus configured to detect an object around the apparatus. The apparatus includes a drive signal generator configured to generate a drive signal to drive a transmitter unit so that a transmitter of the transmitter unit transmits a transmitter wave to an outside thereof. The apparatus includes a detecting unit configured to receive, via a receiver, an echo resulting from reflection of the transmitter wave by the object, and obtain, based on the received echo, a received signal to thereby detect the object based on the received signal.

The drive signal generator is configured to selectively output, as the drive signal, one of a first drive signal and a second drive signal.

The first drive signal has a first temporal frequency change within a first frequency band that is defined from a first lowest frequency to a first highest frequency inclusive. The first frequency band has a first intermediate frequency that is defined as one of a center frequency and an average frequency of the first frequency band. The second drive signal has a second temporal frequency change within a second frequency band that is defined from a second lowest frequency to a second highest frequency inclusive. The second frequency band has a second intermediate frequency that is defined as one of a center frequency and an average frequency of the second frequency band. The second intermediate frequency is different from the first intermediate frequency. The second frequency band is partially overlapped with the first frequency band.

A second aspect of the present disclosure is a method of detecting a surrounding object. The method includes causing a drive signal generator to generate a drive signal to drive a transmitter unit so that a transmitter of the transmitter unit transmits a transmitter wave to an outside thereof. The method includes causing a detecting unit to receive, via a receiver, an echo resulting from reflection of the transmitter wave by the object, and obtain, based on the received echo, a received signal to thereby detect the object based on the received signal. The method selectively uses, as the drive signal, one of a first drive signal and a second drive signal.

The first drive signal has a first temporal frequency change within a first frequency band that is defined from a first lowest frequency to a first highest frequency inclusive. The first frequency band has a first intermediate frequency that is defined as one of a center frequency and an average frequency of the first frequency band. The second drive signal has a second temporal frequency change within a second frequency band that is defined from a second lowest frequency to a second highest frequency inclusive. The second frequency band has a second intermediate frequency that is defined as one of a center frequency and an average frequency of the second frequency band. The second intermediate frequency is different from the first intermediate frequency. The second frequency band is partially overlapped with the first frequency band.

The drive signal generator of each of the apparatus and method is configured to output the drive signal to drive the transmitter unit so that the transmitter of the transmitter unit transmits the transmitter wave to the outside thereof. When receiving, via the receiver, an echo resulting from reflection of the transmitter wave by the object, the detecting unit obtains, based on the received echo, the received signal to thereby detect the object based on the received signal.

The method selectively uses, as the drive signal, one of the first drive signal and the second drive signal. The drive signal generator of the apparatus is configured to selectively output, as the drive signal, one of the first drive signal and the second drive signal.

The first drive signal has the first temporal frequency change within the first frequency band that is defined from the first lowest frequency to the first highest frequency inclusive. The first frequency band has the first intermediate frequency that is defined as one of the center frequency and the average frequency of the first frequency band.

The second drive signal has the second temporal frequency change within the second frequency band that is defined from the second lowest frequency to the second highest frequency inclusive. The second frequency band has the second intermediate frequency that is defined as one of the center frequency and the average frequency of the second frequency band. The second intermediate frequency is different from the first intermediate frequency. The second frequency band is partially overlapped with the first frequency band.

The received signal based on the echo resulting from the transmitter wave generated based on the first drive signal will be referred to as a first received signal. Similarly, the received signal based on the echo resulting from the transmitter wave generated based on the second drive signal will be referred to as a second received signal.

Each of the apparatus and method results in an individual identification accuracy of each of the first and second received signals. Parenthetic reference characters or numerals are assigned to respective elements in some paragraphs of the specification, claims, and abstract. Each parenthetic reference character or numeral of an element represents only an example of a correspondence relationship between the element and a specific means described in the exemplary embodiment described later, and therefore, the parenthetic reference numerals do not limit the technical scope of the present disclosure.

The following describes an exemplary embodiment of the present disclosure with reference to the accompanying drawings. If various modifications applicable to the exemplary embodiment were inserted in the middle of the descriptions of the exemplary embodiment, this insertion would impede the understanding of the exemplary embodiment. For this reason, various modifications of the exemplary embodiment will be described collectively at the end of the descriptions of the exemplary embodiment.

Referring to FIG. 1, an object detection apparatus 1 is installed in an unillustrated vehicle, and configured to detect an object B located around the vehicle. The vehicle in which the object detection apparatus 1 of the exemplary embodiment is installed will be referred to as an own vehicle.

The object detection apparatus 1 of the first embodiment is configured as an ultrasonic sensor. Specifically, the object detection apparatus 1 is configured to transmit a transmitter wave, i.e., an ultrasonic wave burst, toward the outside of the own vehicle. Additionally, the object detection apparatus 1 is configured to receive a reflected wave, i.e., a received echo, resulting from reflection of the transmitter wave by the object B to accordingly obtain a distance to the external object B from the own vehicle.

Specifically, the object detection apparatus 1 includes a transceiver 2, a drive signal generator 3, and a controller 4. The object detection apparatus 1 includes a single sensor housing, and the transceiver 2, drive signal generator 3, and controller 4 are supported by the sensor housing.

The transceiver 2 of the object detection apparatus 1 of the first embodiment is designed as a single device configured to perform a transmitting function and a receiving function. Specifically, the single transceiver 2 is comprised of a single transducer 21, a transmitter unit 20A, and a receiver unit 20B. The transmitter unit 20A and receiver unit 20B share the transducer 21 to perform the transmitting function and receiving function.

Specifically, the transceiver 2 includes the transducer 21, a transmitter circuit 22, and a receiver circuit 23. The transmitter unit 20A includes the transducer 21 and the transmitter circuit 22, and the receiver unit 20B includes the transducer 21 and the receiver circuit 23.

The transducer 21 is electrically connected to the transmitter circuit 22 and receiver circuit 23. The transducer 21 serves as a transmitter that transmits the transmitter wave to the outside thereof, and also serves as a receiver that receives an echo.

Specifically, the transducer 21 is configured as an ultrasonic microphone having an electro-mechanical conversion device, such as a piezoelectric device. The transducer 21 is installed in the own vehicle to be arranged to face the outer surface of the own vehicle; this arrangement of the transducer 21 enables transmitting of the transmitter wave toward the outside of the own vehicle and receiving of an echo, i.e., a reflected wave, from the outside thereof.

The transmitter circuit 22 is configured to drive, in response to an inputted drive signal, the transducer 21 to thereby transmit transmitter waves, i.e., a transmitter wave burst, has a frequency that is within a predetermined ultrasonic frequency band. Specifically, the transmitter circuit 22 includes, for example, a digital/analog (D/A) converter, and is configured to perform, using the D/A converter, a D/A conversion of the inputted drive signal having a digital format into an alternating-current (AC) voltage signal as a drive signal with an analog format, and apply the AC voltage signal to the transducer 21.

The receiver circuit 23 is configured to generate a received signal based on a result of receiving an echo by the transducer 21, and output the received signal to the controller 4. Specifically, the receiver circuit 23 includes, for example, an amplifier and an A/D converter. The receiver circuit 23 is configured to perform, using the amplifier and A/D converter, a predetermined signal-processing task including amplification and an A/D conversion of an inputted AC voltage signal from the transducer 21 to thereby generate a received signal based on the amplitudes of the echo received by the transducer 21. Then, the receiver circuit 23 is configured to output the generated received signal to the controller 4.

As described above, the transceiver 2 is configured such that the transducer 21 serves as a transceiver unit that
(1) Transmits the transmitter wave
(2) Receives the echo resulting from reflection of the transmitter wave transmitted from the transceiver 21 itself by an object B to thereby generate a received signal that includes information regarding the distance to the object B from the own vehicle.

An echo based on reflection of the transmitter wave transmitted from the transducer 21, which is received by the transducer 21 itself, will be referred to as a regular echo. In contrast, an echo based on reflection of the transmitter wave transmitted from another apparatus, i.e., another transducer, which is received by the transducer 21, will be referred to as an irregular echo.

The drive signal generator 3 is configured to generate the drive signal for driving the transmitter unit 20A. The drive signal is, for example, a pulsed signal whose frequency is within the predetermined ultrasonic band, and causes the transmitter unit 20A to transmit the transmitter wave.

In particular, the drive signal generator 3 of the exemplary embodiment is configured to selectively generate, as the drive signal, one of first and second drive signals SD1 and SD2, and selectively output one of the first and second drive signals SD1 and SD2. Each of the first and second drive signals SD1 and SD2 is frequency modulated, and the frequency modulation of the first drive signal SD1 is different from that of the second drive signal SD2. Specific examples of how each of the first and second drive signals SD1 and SD2 is frequency modulated will be described later.

The controller 4 is configured to control how the drive signal generator 3 outputs one of the first and second drive signals SD1 and SD2, and perform a task of processing the received signal outputted from the receiver unit 20B.

Specifically, the controller 4 includes a transmission control unit 41 and a detecting unit 42.

The transmission control unit 41 is configured to output a control signal to the drive signal generator 3 to thereby control how the transmitter unit 20A outputs transmitter waves.

Specifically, the transmission control unit 41 is configured to control the frequency and an output timing of the first drive signal SD1 or the second drive signal SD2 generated by the drive signal generator 3. The frequency of the drive signal, i.e., the frequency of each of the first and second drive signals SD1 and SD2, will also be referred to as a drive frequency. The transmission control unit 41 is configured to control the drive signal generator 3 to selectively output one of the first drive signal SD1 and the second drive signal SD2.

The detection unit 42 is configured to detect, based on the received signal outputted from the receiver circuit 23, the object B.

Specifically, the detection unit 42 controls operations of the receiver circuit 23, and receives the received signal outputted from the receiver circuit 23 to thereby detect the existence of the object B and detect the distance of the object B from the transducer 21.

The detection unit 42 includes a doppler shift (DS) detector 43. The doppler shift detector 43 is configured to detect a doppler shift of the echo received by the transducer 21 relative to the corresponding transmitter wave. Specifically, the detection unit 42 is configured to correct the received signal in accordance with the doppler shift detected by the doppler shift detector 43. The detection unit 42 is also configured to calculate the degree of matching between the corrected received signal and a predetermined reference signal, and determine whether the corrected received signal is based on a regular echo.

The following describes schematic operations of the above-configured object detection apparatus 1 together with benefits obtained by the above-configured object detection apparatus 1 with reference to FIGS. 2 to 9.

Figure 2:
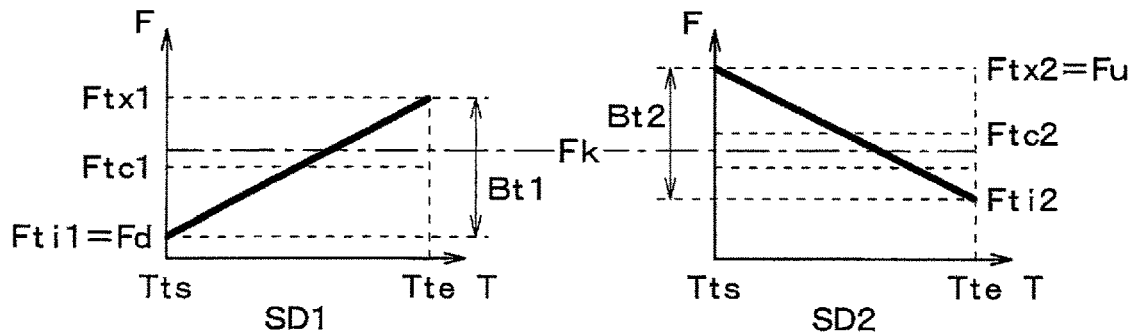
FIG. 2 is a diagram including timing charts, each of which illustrates a frequency characteristic of a corresponding one of first and second drive signals outputted from a drive signal generator illustrated in FIG. 1.

FIG. 2 illustrates a specific example of each of the first drive signal SD1 and second drive signal SD2.

As illustrated in FIG. 1, the transmission control unit 41 of the exemplary embodiment outputs the control signal to the drive signal generator 3, so that the drive signal generator 3 generates the drive signal based on the control signal, and outputs the drive signal to the transmitter unit 20A. The drive signal drives the transmitter unit 20A so that the transmitter circuit 22 excites the transducer 21 based on the inputted drive signal to cause the transducer 21 to serve as the transmitter that transmits a transmitter wave to the outside of the object detection apparatus 1, that is, to the outside of the own vehicle.

The control signal includes a signal, i.e., information, that enables the drive signal generator 3 to output a selected one of the first drive signal SD1 and the second drive signal SD2. Specifically, the transmission control unit 41 instructs the drive signal generator 3 to output any one of the first drive signal SD1 and the second drive signal SD2. In response to receiving the control signal indicative of the first drive signal SD1, the drive signal generator 3 generates the first drive signal SD1, and outputs the first drive signal SD1 to the transmitter unit 20A. In contrast, in response to receiving the control signal indicative of the second drive signal SD2, the drive signal generator 3 generates the second drive signal SD2, and outputs the second drive signal SD2 to the transmitter unit 20A.

Referring to FIG. 2, the first drive signal SD1 and the second drive signal SD2 have respective frequency modulations different from each other. The graph illustrated in FIG. 2 has a horizontal axis T representing time, and a vertical axis F representing drive frequency. Reference label Tts represents a transmission start time that is the start time of transmitting the drive signal. Reference label Tte represents a transmission termination time that is the termination time of terminating the transmitting of the drive signal. Reference label Fk represents a predetermined resonance frequency of the transmitter unit 20A. As a typical example, the resonance frequency Fk is substantially equal to a predetermined resonance frequency of the transducer 21.

The first drive signal SD1 is designed such that the frequency of the first drive signal SD1 changes with time within first frequency band Bt1 that is defined from a first lowest frequency Fti1 to a first highest frequency Ftx1 inclusive. The first lowest frequency Fti1 represent the lower limit of the first frequency band Bt1, and the first highest frequency Ftx1 represents the upper limit of the first frequency band Bt1. The first frequency band Bt1 of the exemplary embodiment is designed to include the resonance frequency Fk. Reference label Ftc1 represents an intermediate frequency that represents the center frequency of the first frequency band Bt1.

The first drive signal SD1 is designed to include a predetermined frequency change; the predetermined frequency change represents that the frequency of the first drive signal SD1 increases toward the first highest frequency Ftx1. That is, the first drive signal SD1 is so called an up-chirp signal. Specifically, the first drive signal SD1 is designed such that the frequency of the first drive signal SD1 increases from the first lowest frequency Fti1 to the first highest frequency Ftx1.

The first drive signal SD1 of the exemplary embodiment is designed such that the frequency of the first drive signal SD1 increases linearly from the first lowest frequency Fti1 at the transmission start time Tts to the first highest frequency Ftx1 at the transmission termination time Tte. The up-chirp of the first drive signal SD1 is designed such that the intermediate frequency Ftc1 of the first frequency band Bt1 coincides with an average frequency of the first frequency band Bt1.

The second drive signal SD2 is designed such that the frequency of the second drive signal SD2 changes with time within a second frequency band Bt2 that is defined from a second lowest frequency Fti2 to a second highest frequency Ftx2 inclusive. The second lowest frequency Fti2 represent the lower limit of the second frequency band Bt2, and the second highest frequency Ftx2 represents the upper limit of the second frequency band Bt2. The second frequency band Bt2 of the exemplary embodiment is designed to include the resonance frequency Fk. Reference label Ftc2 represents an intermediate frequency that represents the center frequency of the second frequency band Bt2.

The second drive signal SD2 is designed to include a predetermined frequency change; the predetermined frequency change represents that the frequency of the second drive signal SD2 decreases toward the second lowest frequency Ftx2. That is, the second drive signal SD2 is so called a down-chirp signal. Specifically, the second drive signal SD2 is designed such that the frequency of the second drive signal SD2 decreases from the second highest frequency Ftx2 to the second lowest frequency Fti2.

The second drive signal SD2 of the exemplary embodiment is designed such that the frequency of the second drive signal SD2 decreases linearly from the second highest frequency Ftx2 at the transmission start time Tts to the second lowest frequency Fti2 at the transmission termination time Tte. The down-chirp of the second drive signal SD2 is designed such that the intermediate frequency Ftc2 of the second frequency band Bt2 coincides with an average frequency of the second frequency band Bt2.

The first drive signal SD1 and the second drive signal SD2 are designed to be partially overlapped with each other. Specifically, the first frequency band Bt1 and the second frequency band Bt2 are designed such that the first lowest frequency Fti1 and the second lowest frequency Fti2 are different from each other. The first frequency band Bt1 and the second frequency band Bt2 are additionally designed such that the first highest frequency Ftx1 and the second highest frequency Ftx2 are different from each other.

Specifically, the first frequency band Bt1 and the second frequency band Bt2 of the exemplary embodiment are designed such that the second lowest frequency Fti2 is higher than the first lowest frequency Fti1. Additionally, the first frequency band Bt1 and the second frequency band Bt2 of the exemplary embodiment are designed such that the second highest frequency Ftx2 is higher than the first highest frequency Ftx1.

The first drive signal SD1 and the second drive signal SD2 are designed such that the intermediate frequency Ftc1 and the intermediate frequency Ftc2 are different from each other. Specifically, the intermediate frequency Ftc1 of the exemplary embodiment is set to be lower than the resonance frequency Fk by the order of 0.5 kHz to several kHz. In contrast, the intermediate frequency Ftc2 of the exemplary embodiment is set to be higher than the resonance frequency Fk by the order of 0.5 kHz to several kHz.

The transmitter unit 20A, which includes the transducer 21 serving as the transmitter for transmitting ultrasonic waves, has the resonance frequency Fk. The transducer 21, which is configured as a resonant ultrasonic microphone, has a frequency characteristic that is substantially identical to a frequency characteristic of a typical bandpass filter.

That is, a frequency range for which the transmitter unit 20A can have favorable transmitting and receiving characteristics of ultrasonic waves is substantially limited to a range of plus or minus several percent around the resonance frequency Fk. This therefor may result in the tracking ability of the transmitter unit 20A being deteriorated if the drive frequency of the transmitter unit 20A is distant from the resonance frequency Fk.

From this viewpoint, the transmitter unit 20A has a predetermined transmission frequency range defined between an upper-limit frequency Fu and a lower-limit frequency Fd inclusive. The transmission frequency range corresponds to a sensitivity range of the transducer 21 when the transducer 21 is used as a receiver. That is, the upper-limit frequency fu of the transmission frequency range of the transmitter unit 20A corresponds to the sensitivity of the transducer 21 of 0 [dB] when the sensitivity of the transducer 21 at the resonance frequency Fk is set to 0 [dB]. The lower-limit frequency Fd of the transmission frequency range of the transmitter unit 20A corresponds to the sensitivity of the transducer 21 of −3 [dB] when the sensitivity of the transducer 21 at the resonance frequency Fk is set to 0 [dB].

The first lowest frequency Fti1 of the exemplary embodiment is set to be equal to the lower-limit frequency Fd of the transmitter unit 20A. The second highest frequency Ftx2 of the exemplary embodiment is set to be equal to the upper-limit frequency Fu of the transmitter unit 20A.

As described above, the frequency-modulated first drive signal SD1 is different from the frequency-modulated second drive signal SD2. The frequency of a transmitter wave is determined based on the drive frequency of the transducer 21, that is, an exciting frequency of the transducer 21. For this reason, a transmitter wave, i.e., a transmitter wave burst, has a frequency change depending on the temporal change of the drive frequency as a feature representing its identification. That is, the frequency-modulated transmitter wave from the first drive signal SD1 and the frequency-modulated transmitter wave from the second drive signal SD2 have respective features that are different from each other.

When an echo resulting from reflection of a transmitter wave by the object B is received by the transducer 21 serving as a receiver, the receiver circuit 23 generates a received signal based on the echo received by the transducer 21. If the echo received by the transducer 21 is a regular echo, the received signal has a frequency-modulated feature that is substantially identical to a frequency-modulated feature of the transmitter wave transmitted from the same transducer 21.

From this viewpoint, the detection unit 42 is configured to calculate the degree of matching between a doppler-shift corrected received signal, which has been corrected in accordance with the doppler shift detected by the doppler shift detector 43, the reference signal, and identify whether the doppler-shift corrected received signal is based on a regular echo. Upon determination that the doppler-shift corrected received signal is based on a regular echo, the detection unit 42 is configured to detect the object B based on the doppler-shift corrected received signal to thereby obtain the distance of the object B from the transducer 21.

The exemplary embodiment uses, as the drive signal, the first drive signal SD1 and the second drive signal SD2. Specifically, the drive signal generator 3 is capable of outputting a selected one of the first drive signal SD1 and the second drive signal SD2. The frequency of the first drive signal SD1 is designed to change with time within the first frequency band Bt1 defined between the first lowest frequency Fti1 and the first highest frequency Ftx1. The second drive signal SD2 is designed to change with time within the second frequency band Bt2 defined between the second lowest frequency Fti2 and the second highest frequency Ftx2.

The second frequency band Bt2 and the first frequency band Bt1 are overlapped with each other while the intermediate frequency Ftc2 of the second frequency band Bt2 is different from the intermediate frequency Ftc1 of the first frequency band Bt1. That is, the second frequency band Bt2 is partially overlapped with the first frequency band Bt1.

The received signal based on an echo resulting from a transmitter wave generated based on the first drive signal SD1 will be referred to as a first received signal SR1. Similarly, the received signal based on an echo resulting from a transmitter wave generated based on the second drive signal SD2 will be referred to as a second received signal SR2.

Figure 3:
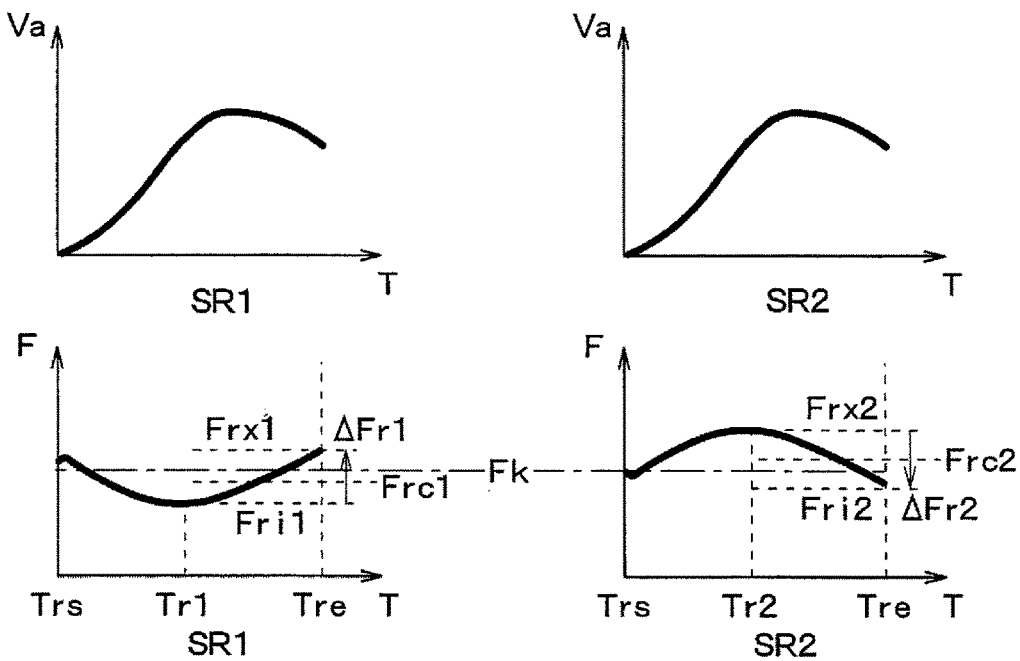
FIG. 3 is a diagram including a first pair of graphs and a second pair of graphs; the first pair of graphs illustrates characteristics of a first received signal corresponding to the first drive signal illustrated in FIG. 2, and the second pair of graphs illustrates characteristics of a second received signal corresponding to the second drive signal illustrated in FIG. 2.

In FIG. 3, reference character T represents time, reference label Trs represents a time of receiving a portion of the transmitter wave transmitted at the transmission start time Tse, and reference label Tre represents a time of receiving a portion of the transmitter wave transmitted at the transmission termination time Tte. In FIG. 3, reference label Va represents the amplitude of each of the first and second received signals SR1 and SR2, and reference character F represents a frequency of each of the first and second received signals SR1 and SR2.

Hereinafter, the frequency of the first received signal SR1 will be referred to as a first received frequency, and the frequency of the second received signal SR2 will be referred to as a second received frequency.

Referring to FIG. 3, the first received frequency F of the first received signal SR1 corresponding to the up-chirp first drive signal SD1 becomes a lowest value Fri1 at time Tr1 that is the substantially midpoint time between the receiving start time Trs and the receiving termination time Tre. In addition, the first received frequency F of the first received signal SR1 gradually increases from the time Tr1, and reaches a highest value Frx1 at the receiving termination time Tre.

The amount of rise AFr1 of the first received frequency F of the first received signal SR1 represents a feature of the identification of the first received signal SR1, and represents the deviation of the highest value Frx1 from the lowest value Fri1. A median value Frc1 between the highest value Frx1 and the lowest value Fri1 of the first received frequency F of the first received signal SR1 is lower than the resonance frequency Fk.

In contrast, referring to FIG. 3, the second received frequency F of the second received signal SR2 corresponding to the down-chirp second drive signal SD2 becomes a highest value Frx2 at time Tr2 that is the substantially midpoint time between the receiving start time Trs and the receiving termination time Tre. In addition, the second received frequency F of the second received signal SR2 gradually decreases from the time Tr2, and reaches a lowest value Fri2 at the receiving termination time Tre.

The amount of reduction AFr2 of the second received frequency F of the second received signal SR2 represents a feature of the identification of the second received signal SR2, and represents the deviation of the highest value Frx2 from the lowest value Fri2. A median value Frc2 between the highest value Frx2 and the lowest value Fri2 of the second received frequency F of the second received signal SR2 is higher than the resonance frequency Fk.

Figure 4:
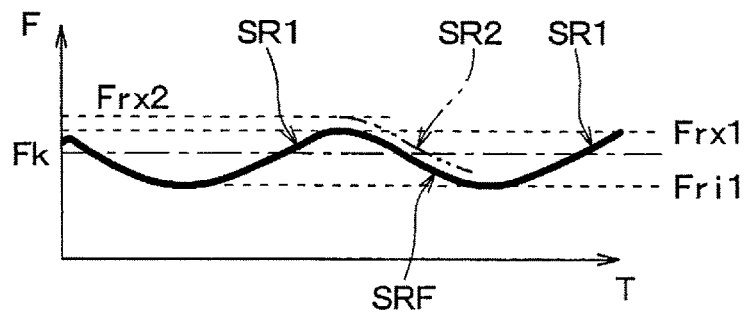
FIG. 4 is a graph illustrating how two first received signals corresponding to the first drive signal are changed over time.

FIG. 4 represents, when two first received signals SR1 are sequentially obtained by the receiver circuit 23, how the two first received signals SR1 are changed over time. As illustrated in FIG. 4, an unintended frequency pattern signal SRF, which is based on the down-chirp second drive signal SD2, is generated between the adjacent two first received signals SR1.

However, if the second received signal SR2 is generated based on the down-chirp second drive signal SD2, the second received signal SR2 ought to be shifted to be higher than the unintended frequency pattern signal SRF. This therefore efficiently reduces an erroneous identification of the two first received signals SR1 due to the existence of the unintended frequency pattern signal SRF.

Figure 5:
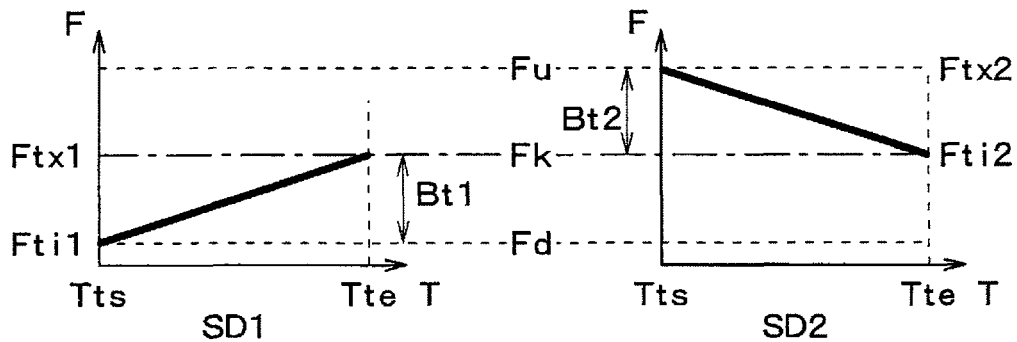
FIG. 5 is a diagram including timing charts, each of which illustrates a frequency characteristic of a corresponding one of first and second drive signals according to a first comparison example.
Figure 6:
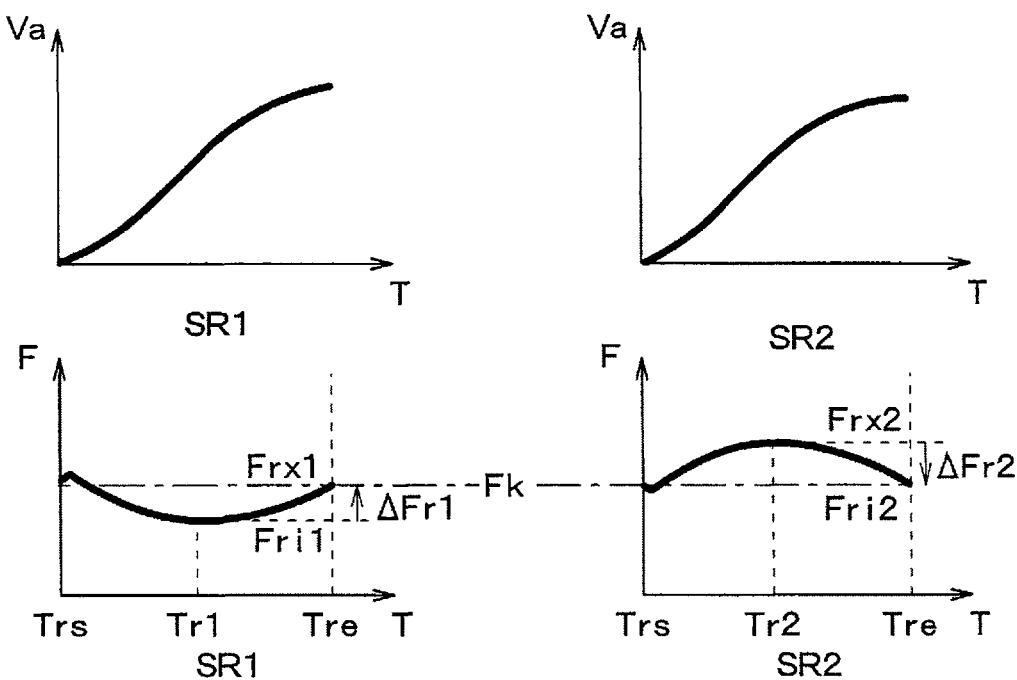
FIG. 6 is a diagram including a first pair of graphs and a second pair of graphs; the first pair of graphs illustrates characteristics of a first received signal corresponding to the first drive signal illustrated in FIG. 5, and the second pair of graphs illustrates characteristics of a second received signal corresponding to the second drive signal illustrated in FIG. 5.

On the other hand, the following describes a first comparison example with reference to FIGS. 5 and 6. The first comparison example is configured such that the up-chirp first drive signal SD1 and the down-chirp second drive signal SD2 are designed to be non-overlapped with each other. FIG. 5 of the first comparison example corresponds to FIG. 2 of the exemplary embodiment, and FIG. 6 of the first comparison example corresponds to FIG. 3 of the exemplary embodiment.

Specifically, the first drive signal SD1 of the first comparison example is designed such that the frequency of the first drive signal SD1 linearly increases from the first lowest frequency Fti1 at the transmission start time Tts to the first highest frequency Ftx1 at the transmission termination time Tte. The first lowest frequency Fti1 of the first comparison example is set to be equal to the lower-limit frequency Fd of the transmission frequency range of the transmitter unit 20A set forth above. The first highest frequency Ftx1 of the first comparison example is set to be equal to the resonance frequency Fk of the transmitter unit 20A.

This results in the first frequency band Bt1 of the first comparison example being located within a frequency range between the lower-limit frequency Fd and the resonance frequency Fk; the frequency range is located to be lower than the resonance frequency Fk of the transmission frequency range of the exemplary embodiment set forth above.

Additionally, the second drive signal SD2 of the first comparison example is designed such that the frequency of the second drive signal SD2 linearly decreases from the second highest frequency Ftx2 at the transmission start time Tts to the second lowest frequency Fti2 at the transmission termination time Tte. The second lowest frequency Fti2 of the first comparison example is set to be equal to the resonance frequency Fk of the transmitter unit 20A. The second highest frequency Ftx2 of the first comparison example is set to be equal to the upper-limit frequency Fu of the transmission frequency range of the transmitter unit 20A set forth above.

This results in the second frequency band Bt2 of the first comparison example being located within a frequency range between the resonance frequency Fk and the upper-limit frequency Fu; the frequency range is located to be higher than the resonance frequency Fk of the transmission frequency range of the exemplary embodiment set forth above.

Referring to FIG. 6, each of the first frequency band Bt1 and the second frequency band Bt2 of the first comparison example is set to be narrower than the corresponding one of the first frequency band Bt1 and the second frequency band Bt2 of the exemplary embodiment set forth above. This setting results in the amount of rise AFr1 of the first received frequency F of the first received signal SR1 according to the first comparison example is smaller than the amount of rise AFr1 of the first received frequency F of the first received signal SR1 according to the above exemplary embodiment.

Similarly, this setting results in the amount of decrease ΔFr2 of the second received frequency F of the second received signal SR2 according to the first comparison example is smaller than the amount of decrease ΔFr2 of the second received frequency F of the second received signal SR2 according to the above exemplary embodiment.

The first comparison example therefore results in an individual identification accuracy of each of the first and second received signals SR1 and SR2 being lower than an individual identification accuracy of the corresponding one of the first and second received signals SR1 and SR2 according to the above exemplary embodiment.

Figure 7:
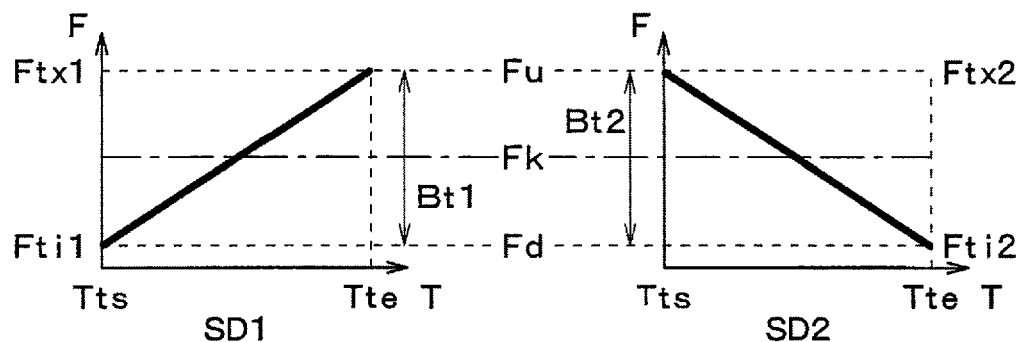
FIG. 7 is a diagram including timing charts, each of which illustrates a frequency characteristic of a corresponding one of first and second drive signals according to a second comparison example.
Figure 8:
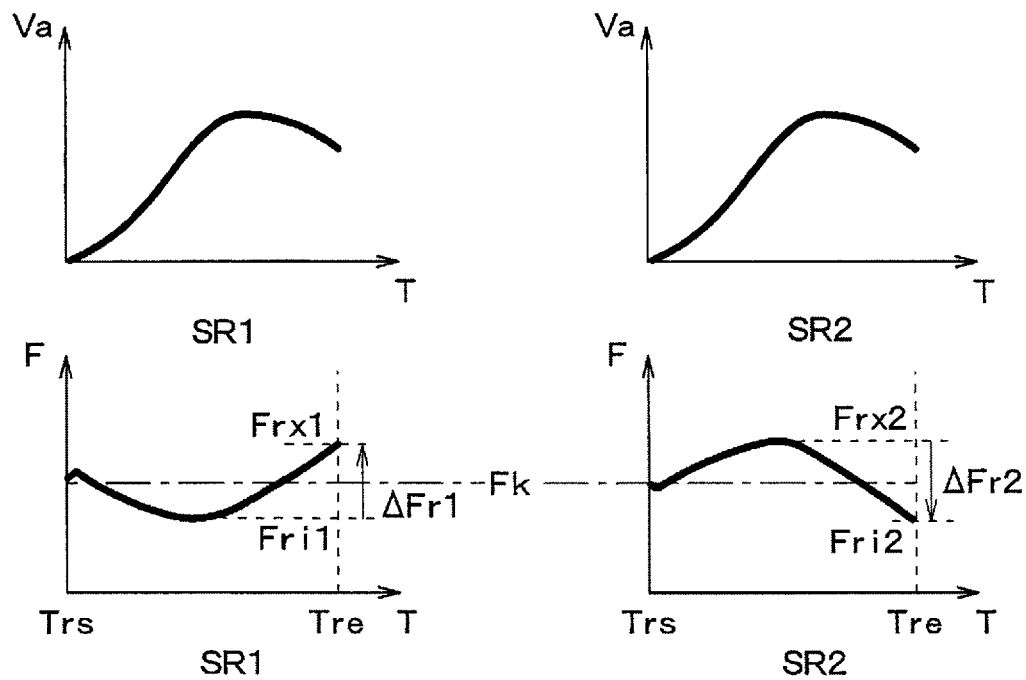
FIG. 8 is a diagram including a first pair of graphs and a second pair of graphs; the first pair of graphs illustrates characteristics of a first received signal corresponding to the first drive signal illustrated in FIG. 7, and the second pair of graphs illustrates characteristics of a second received signal corresponding to the second drive signal illustrated in FIG. 7.
Figure 9:
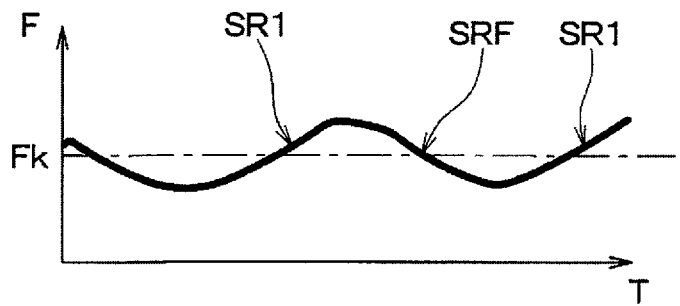
FIG. 9 is a graph illustrating how two first received signals corresponding to the first drive signal are changed over time according to the second comparison example.

Moreover, the following describes a second comparison example with reference to FIGS. 7 to 9.

The second comparison example is configured such that the up-chirp first drive signal SD1 and the down-chirp second drive signal SD2 are designed to be completely overlapped with each other. FIGS. 7 to 9 of the second comparison example respectively correspond to FIGS. 2 to 4 of the exemplary embodiment.

Referring to FIG. 7, the first drive signal SD1 of the second comparison example is designed such that the frequency of the first drive signal SD1 linearly increases from the first lowest frequency Fti1 at the transmission start time Tts to the first highest frequency Ftx1 at the transmission termination time Tte. The first lowest frequency Fti1 of the second comparison example is set to be equal to the lower-limit frequency Fd of the transmission frequency range of the transmitter unit 20A set forth above. The first highest frequency Ftx1 of the second comparison example is set to be equal to the upper-limit frequency Fu of the transmission frequency range of the transmitter unit 20A set forth above.

Additionally, the second drive signal SD2 of the first comparison example is designed such that the frequency of the second drive signal SD2 linearly decreases from the second highest frequency Ftx2 at the transmission start time Tts to the second lowest frequency Fti2 at the transmission termination time Tte. The second lowest frequency Fti2 of the second comparison example is set to be equal to the lower-limit frequency Fd of the transmission frequency range of the transmitter unit 20A set forth above. The second highest frequency Ftx2 of the second comparison example is set to be equal to the upper-limit frequency Fu of the transmission frequency range of the transmitter unit 20A set forth above.

Referring to FIG. 8, each of the first frequency band Bt1 and the second frequency band Bt2 of the second comparison example is set to be narrower than the corresponding one of the first frequency band Bt1 and the second frequency band Bt2 of the exemplary embodiment set forth above. This setting results in the amount of rise ΔFr1 of the first received frequency F of the first received signal SR1 according to the second comparison example is larger than the amount of rise ΔFr1 of the first received frequency F of the first received signal SR1 according to the above exemplary embodiment.

Similarly, this setting results in the amount of decrease ΔFr2 of the second received frequency F of the second received signal SR2 according to the second comparison example is larger than the amount of decrease ΔFr2 of the second received frequency F of the second received signal SR2 according to the above exemplary embodiment.

As illustrated in FIG. 9, when two first received signals SR1 are sequentially obtained by the receiver circuit 23, an unintended frequency pattern signal SRF, which is based on the down-chirp second drive signal SD2, is generated between the adjacent two first received signals SR1. Because it is difficult to distinguish the unintended frequency pattern signal SRF from the second received signal SR2 that can be generated based on the down-chirp second drive signal SD2, the second comparison example may result in an erroneous identification of the two first received signals SR1 due to the existence of the unintended frequency pattern signal SRF.

As described by comparison between the exemplary embodiment and each of the first and second comparison example, the configuration of the exemplary embodiment results in a higher accuracy of identifying the first received signal SR1 and the second received signal SR2. Additionally, the configuration of the exemplary embodiment makes it possible to individually identify the first and second received signals SR1 and SR2 with a higher identification accuracy.

The configuration of the exemplary embodiment therefore enables the object detection apparatus 1 to have a totally higher identification accuracy of received signals.

The present disclosure is not limited to the above exemplary embodiment, and therefore freely modified. The following describes typical modifications of the exemplary embodiment. In particular, the following mainly describes one or more different points of the typical modifications as compared with the exemplary embodiment.

In the exemplary embodiment and typical modifications, the same reference characters are assigned to identical or like parts between the exemplary embodiment and the typical modifications. In the following descriptions of the typical modifications, for the descriptions of each component, which has the same reference character as that of the corresponding component of the exemplary embodiment, the above descriptions of the corresponding component in the exemplary embodiment can be applied as long as there is no technical inconsistency between the same components or no additional explanation for the corresponding component of the typical modifications.

The object detection apparatus 1 is not limited to have a configuration installable in a vehicle, and may therefore have a configuration installable in a vessel or an aerial vehicle.

The object detection apparatus 1 is not limited to have the configuration comprised of the single transceiver 2 and the single drive signal generator 3 as described above. Specifically, the object detection apparatus 1 can be equipped with plural transceivers 2, and plural signal generators 3, the number of which corresponds to the number of plural transceivers 2.

The object detection apparatus 1 is not limited to have the configuration that the single transducer 21 is capable of performing both the transmitting function of transmitting ultrasonic waves and the receiving function of receiving echoes. That is, the object detection apparatus 1 can be configured to include parallel first transducer 21 and second transducer 22. The first transducer 21 is electrically connected to the transmitter circuit 22, and is configured to transmit ultrasonic waves. The second transducer 22 is electrically connected to the receiver circuit 23, and is configured to receive echoes.

The object detection apparatus 1 can be configured such that a predetermined type drive signal is inputted to the single transceiver 2. That is, the drive signal generator 3 of the object detection apparatus 1 installed in the own vehicle can be configured to output only the first drive signal SD1. The drive signal generator 3 of the object detection apparatus 1 installed in another vehicle can be configured to output only the second drive signal SD2. The drive signal generator 3 of the object detection apparatus 1 installed in another vehicle can be configured to output a third drive signal with a frequency modulation different from the frequency modulation of each of the first and second drive signals SD1 and SD2. The third drive signal can be designed as a signal with a constant frequency, such as the resonance frequency Fk.

If the object detection apparatus 1 includes a plurality of transceivers 2, the object detection apparatus 1 can be configured such that drive signals having different waveforms from each other are inputted to the respective transceivers 2.

For example, if the object detection apparatus 1 includes first and second transceivers 2, the object detection apparatus 1 can be configured such that the first and second drive signals SD1 and SD2 are inputted to the respective first and second transceivers 2. The object detection apparatus 1 can be configured to use at least three-type drive signals, such as the first drive signal SD1, the second drive signal SD2, and a third drive signal having a frequency modulation that is different from the frequency modulation of each of the first and second drive signals SD1 and SD2. This enables transmitter waves 25 transmitted from the transceivers 2 to be properly distinguished from each other. That is, the present disclosure is not limited to two-type drive signals, such as the first drive signal SD1 and the second drive signal SD2. Specifically, the drive signal generator 3 can be configured to selectively output one of the at least three-type drive signals including the first drive signal SD1 and the second drive signal SD2. The transmission control unit 41 can be configured to instruct the drive signal generator 3 to output a selected one of the at least three-type drive signals.

The object detection apparatus 1 can be configured to detect, using plural transducers 21, a two-dimensional position of the object B relative to the own vehicle in accordance with a known triangular method. The object detection apparatus 1 of this modification can be configured such that the transducers 21 installed in the own vehicle respectively transmit transmitter waves that have a predetermined frequency characteristic. In this modification, a regular echo is a received echo resulting from one of the transmitter waves transmitted from the own vehicle, and an irregular echo is a received echo resulting from another transmitter wave transmitted from another vehicle.

The configuration of each component of the object detection apparatus 1, such as the configuration of the transmitter circuit 22 or the configuration of the receiver circuit 23, is not limited to that described in the exemplary embodiment.

For example, the D/A converter can be installed in the drive signal generator in place of in the transmitter circuit 22.

The present disclosure can employ one of various driving-signal waveforms except for the driving-signal waveforms described in the exemplary embodiment. For example, the first drive signal SD1 can have a nonlinear frequency modulation that has the intermediate frequency Ftc1 and the average frequency that can be different from each other. Specifically, the intermediate frequency Ftc1 according to this modification can be set to the center frequency or average frequency of the first frequency band Bt1. The intermediate frequency Ftc2 according to this modification can be set to the center frequency or average frequency of the second frequency band Bt2.

Figure 10:
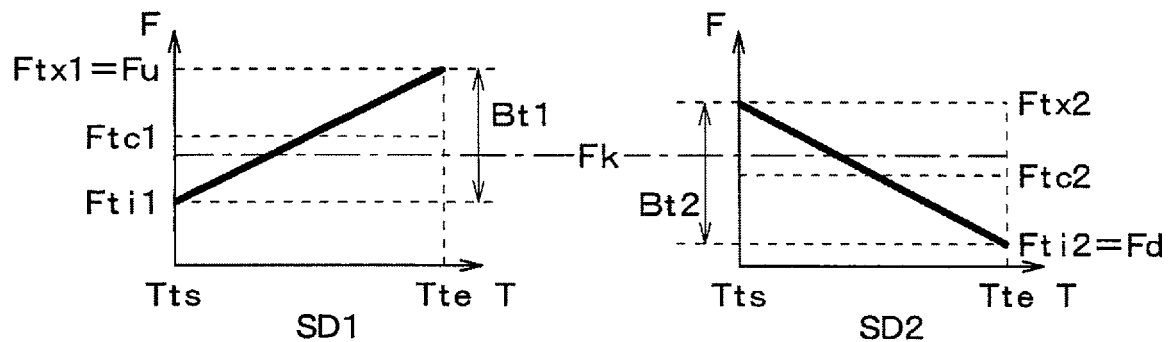
FIG. 10 is a diagram including timing charts, each of which illustrates a frequency characteristic of a corresponding one of first and second drive signals outputted from a drive signal generator illustrated in FIG. 1 according to a first partial modification.

FIG. 10 illustrates a first partial modification of the specific example illustrated in FIG. 2. Specifically, the temporal down-chirp frequency change shown as the second drive signal SD2 illustrated in FIG. 2 is changed to a temporal up-chirp frequency change, and the first drive signal SD1 according to the first partial modification is designed to have the temporal up-chirp frequency change (see FIG. 10).

Similarly, the temporal up-chirp frequency change shown as the first drive signal SD1 illustrated in FIG. 2 is changed to a temporal down-chirp frequency change, and the second drive signal SD2 according to the first partial modification is designed to have the temporal down-chirp frequency change (see FIG. 10).

That is, the first drive signal SD1 of the first partial modification is designed such that the frequency of the first drive signal SD1 linearly increases from the first lowest frequency Fti1 at the transmission start time Tts to the first highest frequency Ftx1 at the transmission termination time Tte.

In contrast, the second drive signal SD2 of the first partial modification is designed such that the frequency of the second drive signal SD2 linearly decreases from the second highest frequency Ftx2 at the transmission start time Tts to the second lowest frequency Fti2 at the transmission termination time Tte.

The first frequency band Bt1 and the second frequency band Bt2 of the first partial modification are designed such that the second lowest frequency Fti2 is lower than the first lowest frequency Fti1. Additionally, the first frequency band Bt1 and the second frequency band Bt2 of the first partial modification are designed such that the second highest frequency Ftx2 is lower than the first highest frequency Ftx1.

The second lowest frequency Fti2 of the first partial modification is set to coincide with the lower-limit frequency Fd of the above transmission frequency range of the transmitter unit 20A of the first partial modification. Additionally, the first highest frequency Ftx1 of the first partial modification is set to coincide with the upper-limit frequency Fu of the above transmission frequency range of the transmitter unit 20A of the first partial modification.

The intermediate frequency Ftc1 according to the first partial modification is set to be higher than the resonance frequency Fk by the order of 0.5 kHz to several kHz. In contrast, the intermediate frequency Ftc2 of the exemplary embodiment is set to be lower than the resonance frequency Fk by the order of 0.5 kHz to several kHz. In con The first and second drive signals SD1 and SD2 of the first partial modification illustrated in FIG. 10 achieves the same technical benefits as those described in the exemplary embodiment.

Figure 11:
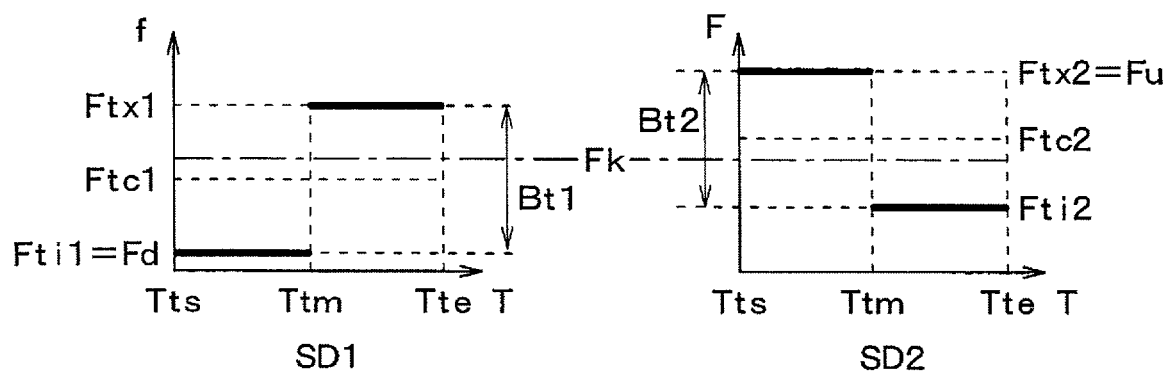
FIG. 11 is a diagram including timing charts, each of which illustrates a frequency characteristic of a corresponding one of first and second drive signals outputted from a drive signal generator illustrated in FIG. 1 according to a second partial modification.

FIG. 11 illustrates a second partial modification of the specific example illustrated in FIG. 2. Specifically, each of the first and second drive signals SD1 and SD2 according to the second partial modification is designed such that the frequency of the corresponding one of the first and second drive signals SD1 and SD2 changes stepwisely.

Specifically, the first drive signal SD1 according to the second partial modification is designed such that (1) The drive frequency is maintained at the first lowest frequency Fti1 from the transmission start time Tts to an intermediate time Ttm (2) The drive frequency changes stepwisely at the intermediate time Ttm from the first lowest frequency Fti1 to the first highest frequency Ftx1

(3) The drive frequency is maintained at the first highest frequency Ftx1 from the intermediate time Ttm to the transmission termination time Tte The intermediate time Ttm represents a substantially halfway point of time between the transmission start time Tts and the transmission termination time Tte.

The first lowest frequency Fti1, the first highest frequency Ftx1, and the intermediate frequency Ftc1 according to the second partial modification are the same as those described in the exemplary embodiment.

Additionally, the second drive signal SD2 according to the second partial modification is designed such that (1) The drive frequency is maintained at the second highest frequency Ftx2 from the transmission start time Tts to the intermediate time Ttm (2) The drive frequency changes stepwisely at the intermediate time Ttm from the second highest frequency Ftx2 to the second lowest frequency Fti2

(3) The drive frequency is maintained at the second lowest frequency Fti2 from the intermediate time Ttm to the transmission termination time Tte The second lowest frequency Fti2, the second highest frequency Ftx2, and the intermediate frequency Ftc2 according to the second partial modification are the same as those described in the exemplary embodiment.

The first and second drive signals SD1 and SD2 of the second partial modification illustrated in FIG. 11 achieves the same technical benefits as those described in the exemplary embodiment.

Each of the first drive signal SD1 and the second drive signal SD2 illustrated in FIG. 11 has a corresponding discrete frequency change, but the present disclosure is not limited thereto. Specifically, the drive frequency of each of the first drive signal SD1 and the second drive signal SD2 can linearly change around the intermediate time Ttm. Additionally, the frequency of each of the first drive signal SD1 and the second drive signal SD2 can change in a sigmoid curve.

The elements constituting the exemplary embodiment not necessarily ought to be interpreted as essential components except that (i) at least one of the elements is clearly described to be essential or (ii) at least one of the elements is considered in principle as an essential element.

If the exemplary embodiment describes specific numerical values, which represent, for example, the number of some elements, a value or quantity that at least one parameter takes, and/or one or more specific ranges, the present disclosure is not limited to the specific numerical values except that (i) the specific numerical values are clearly described to be essential or (ii) the present disclosure is clearly limited in principle to the specific numerical values.

Similarly, if the exemplary embodiment describes the specific shapes of several elements, the specific directions of the several elements, and/or the specific positional relationship between the several elements, the present disclosure is not limited to the specific shapes of several elements, the specific directions of the several elements, and/or the specific positional relationship between the several elements except that (i) The specific shapes of several elements, the specific directions of the several elements, and/or the specific positional relationship between the several elements are clearly described to be essential or (ii) The present disclosure is limited in principle to the specific shapes of several elements, the specific directions of the several elements, and/or the specific positional relationship between the several elements The present disclosure is not limited to the above modifications, so that other modifications in addition to the above modifications can be included in the present disclosure. The above modifications and other modifications can be at least partially combined with each other. The whole or part of the exemplary embodiment and the whole or part of each modification can be combined with each other.

What is claimed is:

1. An apparatus configured to detect an object around the apparatus, the apparatus comprising:
   a drive signal generator configured to generate a drive signal to drive a transmitter unit so that a transmitter of the transmitter unit transmits a transmitter wave to an outside thereof; and
   a detecting unit configured to:
      receive, via a receiver, an echo resulting from reflection of the transmitter wave by the object; and
      obtain, based on the received echo, a received signal to thereby detect the object based on the received signal,
   wherein:
   the drive signal generator is configured to selectively output, as the drive signal, one of a first drive signal and a second drive signal;
   the first drive signal has a first temporal frequency change within a first frequency band that is defined from a first lower-limit frequency to a first upper-limit frequency inclusive;
   the first frequency band has a first intermediate frequency that is defined as one of a center frequency and an average frequency of the first frequency band;
   the second drive signal has a second temporal frequency change within a second frequency band that is defined from a second lower-limit frequency to a second upper-limit frequency inclusive;
   the second frequency band has a second intermediate frequency that is defined as one of a center frequency and an average frequency of the second frequency band;
   the second intermediate frequency is different from the first intermediate frequency; and
   the second frequency band is partially overlapped with the first frequency band;
   the received signal of the received echo resulting from reflection of the transmitter wave that is based on the first drive signal is defined as a first received signal;
   the received signal of the received echo resulting from reflection of the transmitter wave that is based on the second drive signal is defined as a second received signal, a frequency increasing direction of the second drive signal being opposite to a frequency increasing direction of the first drive signal; and
   a peak frequency of the second received signal is higher than a peak frequency formed between two sequential first received signals.

2. The apparatus according to claim 1, further comprising:
   a transmission control unit configured to instruct the drive signal generator to selectively output one of the first drive signal and the second drive signal.

3. The apparatus according to claim 1, wherein:
   each of the first frequency band and the second frequency band is designed to include a resonance frequency of the transmitter unit.

4. The apparatus according to claim 1, wherein:
   the first frequency band and the second frequency band are such that:
   the first lower-limit frequency and the second lower-limit frequency are different from each other; and
   the first upper-limit frequency and the second upper-limit frequency are different from each other.

5. The apparatus according to claim 4, wherein:
   the first frequency band and the second frequency band are such that:
   the second lower-limit frequency is higher than the first lower-limit frequency; and
   the second upper-limit frequency is higher than the first upper-limit frequency.

6. The apparatus according to claim 5, wherein:
   the transmitter unit has a predetermined transmission frequency range defined from a lower-limit frequency and an upper-limit frequency inclusive;
   the first lower-limit frequency is set to be equal to the lower-limit frequency of the transmission frequency range of the transmitter unit; and
   the second upper-limit frequency is set to be equal to the upper-limit frequency of the transmission frequency range of the transmitter unit.

7. The apparatus according to claim 1, wherein:
   the first temporal frequency change of the first drive signal includes a temporal frequency increase toward the first upper-limit frequency; and
   the second temporal frequency change of the second drive signal includes a temporal frequency decrease toward the second lower-limit frequency.

8. The apparatus according to claim 7, wherein:
   the first temporal frequency change of the first drive signal includes, as the temporal frequency increase, a frequency increase from the first lower-limit frequency toward the first upper-limit frequency; and
   the second temporal frequency change of the second drive signal includes, as the temporal frequency decrease, a frequency decrease from the second upper-limit frequency toward the second lower-limit frequency.

9. A method of detecting a surrounding object, the method comprising:
   causing a drive signal generator to generate a drive signal to drive a transmitter unit so that a transmitter of the transmitter unit transmits a transmitter wave to an outside thereof;
   causing a detecting unit to:
      receive, via a receiver, an echo resulting from reflection of the transmitter wave by the object; and
      obtain, based on the received echo, a received signal to thereby detect the object based on the received signal,
   wherein:

the method selectively uses, as the drive signal, one of a first drive signal and a second drive signal;

the first drive signal has a first temporal frequency change within a first frequency band that is defined from a first lower-limit frequency to a first upper-limit frequency inclusive;

the first frequency band has a first intermediate frequency that is defined as one of a center frequency and an average frequency of the first frequency band;

the second drive signal has a second temporal frequency change within a second frequency band that is defined from a second lower-limit frequency to a second upper-limit frequency inclusive;

the second frequency band has a second intermediate frequency that is defined as one of a center frequency and an average frequency of the second frequency band;

the second intermediate frequency is different from the first intermediate frequency; and the second frequency band is partially overlapped with the first frequency band;

the received signal of the received echo resulting from reflection of the transmitter wave that is based on the first drive signal is defined as a first received signal;

the received signal of the received echo resulting from reflection of the transmitter wave that is based on the second drive signal is defined as a second received signal, a frequency increasing direction of the second drive signal being opposite to a frequency increasing direction of the first drive signal; and a peak frequency of the second received signal is higher than a peak frequency formed between two sequential first received signals.

10. The method according to claim 9, further comprising:

instructing the drive signal generator to selectively output one of the first drive signal and the second drive signal.

11. The method according to claim 9, wherein:

each of the first frequency band and the second frequency band is designed to include a resonance frequency of the transmitter unit.

12. The method according to claim 9, wherein:

the first frequency band and the second frequency band are designed such that:

the first lower-limit frequency and the second lower-limit frequency are different from each other; and the first upper-limit frequency and the second upper-limit frequency are different from each other.

13. The method according to claim 12, wherein:

the first frequency band and the second frequency band are designed such that:

the second lower-limit frequency is higher than the first lower-limit frequency; and the second upper-limit frequency is higher than the first upper-limit frequency.

14. The method according to claim 13, wherein:

the first lower-limit frequency is set to be equal to a lower-limit frequency of the transmission frequency range of the transmitter unit; and the second upper-limit frequency is set to be equal to an upper-limit frequency of the transmission frequency range of the transmitter unit.

15. The method according to claim 9, wherein:

the first temporal frequency change of the first drive signal includes a temporal frequency increase toward the first upper-limit frequency; and the second temporal frequency change of the second drive signal includes a temporal frequency decrease toward the second lower-limit frequency.

16. The method according to claim 15, wherein:

the first temporal frequency change of the first drive signal includes, as the temporal frequency increase, a frequency increase from the first lower-limit frequency toward the first upper-limit frequency; and the second temporal frequency change of the second drive signal includes, as the temporal frequency decrease, a frequency decrease from the second upper-limit frequency toward the second lower-limit frequency.

\* \* \* \* \*